US009608721B2

(12) United States Patent
Dawe (10) Patent No.: US 9,608,721 B2
(45) Date of Patent: Mar. 28, 2017

(54) METHOD OF CALCULATING TRANSMITTER AND DISPERSION PENALTY FOR PREDICTING OPTICAL DATA LINK AND SIGNAL QUALITY

(71) Applicant: Mellanox Technologies Denmark Aps, Roskilde (DK)

(72) Inventor: Piers James Geoffrey Dawe, Colchester (GB)

(73) Assignee: MELLANOX TECHNOLOGIES DEMARK APS, Roskilde (DK)

( * ) Notice: Subject to any disclaimer, the term of this patent is extended or adjusted under 35 U.S.C. 154(b) by 76 days.

(21) Appl. No.: 14/702,045

(22) Filed: May 1, 2015

(65) Prior Publication Data
US 2015/0318919 A1    Nov. 5, 2015

(30) Foreign Application Priority Data

May 1, 2014   (DK) ................................ 2014 00241

(51) Int. Cl.
*H04B 17/00*   (2015.01)
*H04B 10/077*  (2013.01)
*H04L 1/20*    (2006.01)
*H04B 10/2507* (2013.01)

(52) U.S. Cl.
CPC ....... *H04B 10/077* (2013.01); *H04B 10/0775* (2013.01); *H04B 10/2507* (2013.01); *H04L 1/20* (2013.01); *H04L 1/203* (2013.01)

(58) Field of Classification Search
CPC .............. H04B 10/077; H04B 10/0775; H04B 10/2507; H04L 1/20; H04L 1/203

USPC ........................................................... 398/16
See application file for complete search history.

(56) References Cited

U.S. PATENT DOCUMENTS

| 2004/0090659 A1* | 5/2004 | Zhang ................. G02F 1/0123 359/240 |
| 2004/0184802 A1 | 9/2004 | Xu |
| 2006/0067688 A1 | 3/2006 | Inman et al. |

(Continued)

FOREIGN PATENT DOCUMENTS

| WO | 2006/069377 A2 | 6/2006 |
| WO | 2007/041807 A1 | 4/2007 |

(Continued)

OTHER PUBLICATIONS

Dawe, "Improved 100 GBASE-SR4 transmitter testing" May 2014.*

*Primary Examiner* — Juan A Torres
(74) *Attorney, Agent, or Firm* — Buchanan Ingersoll & Rooney PC (57) ABSTRACT

A method of calculating a transmitter and dispersion penalty for predicting optical link signal quality includes providing an optical link; capturing an averaged eye, using an optical test signal sequence to drive the transmitter with an oscilloscope receiver having an oscilloscope bandwidth as available; and from the averaged eye, capturing histograms A1; capturing a non-averaged eye using an optical test signal sequence to drive the transmitter, and from the non-averaged eye, capturing histograms B1; de-convolving histograms A1 from histograms B1; filtering waveform from step 1), convolve the filtered waveform from step 4) with the estimate of the noise from 3); and calculating "soft" TDP based on the probability distribution function.

26 Claims, 2 Drawing Sheets

(56) References Cited

U.S. PATENT DOCUMENTS

| | | | |
|---|---|---|---|
| 2006/0159462 A1* | 7/2006 | Aronson | H04B 10/2581 398/138 |
| 2006/0263084 A1* | 11/2006 | Swenson | H04B 10/0731 398/23 |
| 2007/0036084 A1* | 2/2007 | Lindsay | H04B 10/66 370/246 |
| 2008/0298801 A1 | 12/2008 | King et al. | |
| 2009/0257745 A1* | 10/2009 | Petrilla | G02F 1/0136 398/30 |
| 2010/0329319 A1 | 12/2010 | Dai et al. | |

FOREIGN PATENT DOCUMENTS

| | | |
|---|---|---|
| WO | 2009/055294 A1 | 4/2009 |
| WO | 2012/026951 A1 | 3/2012 |
| WO | 2014/011224 A1 | 1/2014 |

\* cited by examiner

METHOD OF CALCULATING TRANSMITTER AND DISPERSION PENALTY FOR PREDICTING OPTICAL DATA LINK AND SIGNAL QUALITY

The present invention relates to methods of calculating a transmitter and dispersion penalty for predicting optical link signal quality, where the optical link comprises at least one transmitter, at least one optical fiber, such as Multimode Optical Fiber (MMF), and at least one receiver.

BACKGROUND OF THE INVENTION

Figure 3:
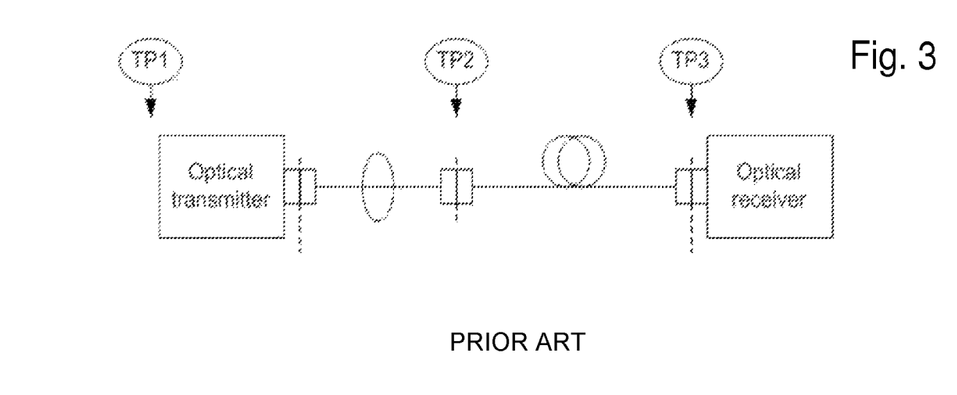
FIG. 3 discloses a transmitter, optical fiber, and receiver.

Communication links, such as optical links, herein defined as optical links for carrying optical signals containing e.g. data—thus providing an optical data link such as the Ethernet standard links—or other types of information, are provided by one or more transmitters, often laser transmitters, cabling in the form of one or more optical fibers, such as Multi-Mode optical Fibers (MMF) and one or more receivers, and it is convenient within the field to specify these separately and standardize these to allow interoperability. Further, for standardization purposes within the transmitter manufacturing industry it is convenient to specify the transmitter (Tx) by reference to a small number of metrics that correlate to expected performance when used with the worst allowed optical fiber and receiver (Rx). The general term "Transmitter and Dispersion Penalty" has been used as a primary metric for providing a quantified measure of a transmitter's quality and can be used in a specification that allows a trade-off between quality and the transmitted signal amplitude. Many versions of TDP have been defined, and are generally related for providing a particular bit error ratio (BER), as will be further described below. It has been convenient for the standards to measure the transmitter close to its output, at TP2, see FIG. 3, being generally in the field considered to be not the output of the transmitter itself, but instead the output of a patch cord (indicated with an ellipse on the line), without using a worst-case optical fiber and receiver (this is done in TDP for multimode fiber), and also without a reference transmitter.

The eye mask definitions or "eye" is well known but do not provide good correlation to expected performance when used with the worst allowed optical fiber and receiver.

As mentioned above, see FIG. 3, the transmitter, optical fiber, and receiver impair and attenuate the signal, and when the optical fiber is a MMF, filtering and distortion is primarily caused by modal dispersion and chromatic dispersion. If the oscilloscope is provided at TP2, i.e. after the patch cord and not linked to a longer length optical fiber for example, the eye-mask at TP2 cannot correlate well to link performance, because the optical fiber and the receiver itself change or attenuate the signal and cause noise therein.

Other considerations for increasing signaling rates are noise arising in the elements of the link (in and between transmitter, optical fiber and receiver, respectively) and the instrument noise in a measurement. Forward error correction (FEC) may be used, in which case the required BER for the link, before correction, can be e.g. $5 \times 10^{-5}$ for arriving at a corrected BER of $10^{-12}$. The relaxed BER means that fewer samples are needed in a measurement so an oscilloscope may be used rather than a BERT, i.e. bit error ratio tester.

At the Institute of Electrical and Electronics Engineers (IEEE) 802.3bm standard group, called the 40 Gb/s and 100 Gb/s (Gigabit per second) Fiber Optic Task Force, it was discussed whether to switch the IEEE transmitter specification for 100 Gb/s Ethernet optical links of the port type 100GBASE-SR4, from the present industry standard method in a similar way to the general term named the "Transmitter and Dispersion Penalty" (TDP) to a different oscilloscope or scope based method, because the established TDP method is thought to be too difficult to do accurately in practice, and the ability of TDP to adequately predict link margin for MMF links is questioned.

The 100GBASE-SR4 is a port type for multi-mode optical fiber defined in IEEE Task Force 802.3bm and uses 850 nm lasers for the optical transmitters Tx. Its physical coding sublayer 64b/66b PCS is defined in IEEE 802.3 Clause 82, its FEC transcoding in Clause 91 and its Physical Medium Dependent PMD in Clause 95. It uses four lanes of multi-mode fiber delivering serialized RS-FEC encoded data at a rate of 25.78125 Gb/s per lane. An 8-fiber link providing four 25 Gb/s lanes in each direction, up to 70-100 m long, uses Optical Multimode (OM) MMF, such as the OM3 and/or OM4 type MMF. The groups of 802.3 are generally concerned with the maintenance and extension of the Ethernet data communications standard. Thus, 100GBASE-SR4 is one of the latest Physical Layer or PHY standards of the IEEE 802.3 Ethernet Working Group. 100GBASE-SR4 is primarily used in datacenter storage servers and high-performance servers, and in Ethernet switches.

TDP is a known standard method for measuring penalty which is used to control the Bit Error Ratio (BER) in the conveyed optical signal in particular by the transmitter Tx and through the optical fiber, i.e. part of the optical data link (ODL), which should be lower than 1E-12 (1 per $10^{12}$ bits) required today for most data communication systems. TDP is the difference in sensitivity for a reference receiver when comparing an ideal transmitter with a very short fiber against the transmitter under test with the rated fiber dispersion. It is defined by the change in receiver sensitivity due to transmitter impairments and its transmission over a defined optical path. It is manifested as a shift of the system's Bit Error Ratio (BER) curves for these two cases: 1) The reference condition: ideal transmitter (Tx) (specified with minimal rise and fall times and noise) with the same Optical Modulation Amplitude (OMA) as the actual Device Under Test (DUT) with no dispersive fiber in the path and the standard reference receiver bandwidth; 2) The impaired condition: DUT with specified fiber path and/or a lower reference receiver bandwidth. TDP is the ratio, or difference in decibels, between the received OMAs measured at the specified BER (sensitivities) in these two scenarios. When used for multimode link specification, the low bandwidth of a specified fiber path is implemented as a filter in the reference receiver in order to give consistent and accurate measurements. This parameter TDP is defined in IEEE 802.3ae-2002, for 10 Gb/s Ethernet and a similar definition was proposed in the draft amendment IEEE, P802.3bm.

TDP enables a trade-off between signal strength and signal quality. TDP is further suitable both for links that are protected by Forward Error Correcting (FEC) and for links which are not.

The reason why it was discussed to switch was that the known TDP used for 100GBASE-SR4 was thought to be too difficult to do in practice because it required using a reference transmitter ($T_{x\ ref}$) and special reference receiver ($R_{x\ ref}$). These are believed not to be generally commercially available, and building them from available parts is time consuming and not up to standards. Both the reference transmitter and the special reference receiver would need calibrating and this would add expenses to be avoided.

Alternative methods for estimating or calculating TDP's for the 100GBASE-SR4 have been suggested, but still a satisfactory one is needed in the field with the purpose of estimating how well the transmitter will perform within a given optical link, such as a MMF or a worst MMF link specified by 100GBASE-SR4.

One such alternative method, called VECPq has been proposed for Fiber Channel which is another optical communication standard. In this method, one measures an averaged signal with a Pseudo Random Binary Sequence (PRBS) test pattern with generator of length 9 (PRBS9). This has the advantage that no special reference transmitter or receiver is needed, and it calculates the averaged signal in the right bandwidth assuming the worst case link. Some disadvantages are that it does not screen for problems that arise with a longer pattern or service signal, and does not give a transmitter any credit for having better-than-worst noise. VECPq is actually a measure of the Signal to Noise Ratio (SNR) margin and not of penalty and does not treat different transmitters with the same penalty equally. Therefore, it is not always suitable for a trade-off between signal strength and signal quality. If a VECPq limit is set taking these weaknesses into account, VECPq as a standard may be hard for typical laser transmitters to meet up to.

Another such alternative, called VECP or TxVEC, is quite adequate for showing that a very good transmitter is actually very good, but may not be useful for establishing whether a mediocre transmitter is adequate. VECP is neither a measure of the SNR margin nor of penalty and does not treat different transmitters with the same penalty equally. Further, it measures the signal in the wrong bandwidth, i.e. not as it will be used in the worst case link scenario. Therefore, it is not suitable for a trade-off between signal strength and signal quality. If a VECP limit is set taking these weaknesses into account, VECP as a standard may also be very hard for typical lasers to meet up to.

An alternative was adopted by the Optical Internetworking Forum (OIF) CEI-28G-VSR "Common Electrical I/O (CEI)—Electrical and Jitter Interoperability agreements for 6G+ bps, 11G+ bps and 25G+ bps I/O clause 13". This method uses extrapolation to find the desired percentile. However, this is an electrical specification and not optical; the expected variety of transmitters is much less, and although correlation to actual penalty after an electrical channel is poor, buying out the uncertainty with signal strength is affordable in this case, and a trade-off between signal strength and signal quality was not envisaged to be necessary.

As mentioned above, a known technique within the field is using the "eye" i.e. eye mask test, which is generally known to the skilled person as a basic test of transmitter performance. The eye diagram is provided using an oscilloscope receiver's display in which a pseudo-random digital data signal from a receiver is repetitively sampled and applied to the vertical input, while the signalling rate is used to trigger the horizontal sweep. System performance information can then be derived by analyzing the display. A more open eye pattern corresponds to minimal signal distortion. Distortion of the signal waveform due to inter-symbol interference and noise appears as closure of the eye pattern. Histograms can be provided, showing the signal reception density statistics at any one particular part of the eye diagram.

The advantages here of the eye mask test are that no special reference transmitter $T_{ref}$ or additional receiver is needed, it is familiar to the skilled person, it screens for problems that arise with a longer pattern or service signal, and gives a transmitter credit for having better-than-worst noise. However, the disadvantages are that it does not measure a penalty or an SNR margin and does not treat different transmitters with the same penalty equally. Further, it may measure the signal in the wrong bandwidth, i.e. not as it will be used in the worst case link scenario. Poor correlation to actual penalty after a fiber means that the specification would have to be set very harsh to avoid unusable transmitters passing. A lack of consensus in defining mask margin would have to be overcome to enable trade-off between signal strength and signal quality. The observed eye includes noise from the oscilloscope, which is significant at the bandwidth needed for 100GBASE-SR4, and it is difficult to correct the eye measurement for this noise.

Another known method is to generate a so-called "bathtub curve" in which the decision point of a receiver is scanned across the eye, and the BER at each decision point is found. However, the bathtub of the transmitted signal does not directly correlate to the useful performance in the complete link with worst-case optical fiber and receiver, and the bathtub is affected by the noise of the test receiver. Single points from bathtub curves do not accurately predict performance after a worst case fiber and receiver.

DETAILED DESCRIPTION

There is therefore proposed methods of calculating a transmitter and dispersion penalty for predicting optical link signal quality.

In an embodiment a method of calculating a transmitter and dispersion penalty for predicting optical link signal quality comprises:

0) provide an optical link comprising an optical transmitter, an optical fiber, and an optical oscilloscope receiver linked together;
1) capture an averaged eye, using an optical test signal sequence to drive the transmitter with the oscilloscope receiver having an oscilloscope bandwidth as available; and from the averaged eye, capturing histograms A1;
2) capture a non-averaged eye using an optical test signal sequence to drive the transmitter, and from the non-averaged eye, capturing histograms B1;
3) de-convolve histograms A1 from histograms B1, giving an estimate of the noise on the signal and the noise stemming from the oscilloscope;
4) filter waveform from 1), i.e. the waveform that gave the averaged eye, as if in a bandwidth representative of the dispersion of the fiber link and the expected bandwidth of a data receiver in service,
5) convolve the filtered waveform from 4) with the estimate of the noise from 3); proving an eye and capturing the histogram of said eye providing a probability distribution function;
6) calculate "soft" TDP based on said probability distribution function.

One object being to estimate how well the transmitter will perform within an optical link. In an embodiment, the optical link is an optical data link. In another, it is not an optical data link.

The method hereby uses scope measurement in the form of the histograms but interprets it in a more careful and relevant way than known methods. The method has been described in detail in the paper "Improved 100 GBASE-SR4 transmitter testing" by the inventor, and as presented at a IEEE 802.3bm meeting in May 2014, the content of which is herein incorporated by reference in its entirety. The method hereby utilizes the direct analysis of eye diagram waveform statistics. In other words, in the method above, there is measured a signal and recorded three things: Averaged eye, averaged waveform e.g. of the complete PRBS, non-averaged eye.

In an embodiment, the waveforms could be derived from the same measurement, or two or more separate measurements, e.g. to improve statistics.

The method provides a test procedure for testing a given transmitter with an oscilloscope receiver to see if the transmitter is suitable for use in an optical data link that would use such given transmitter, an optical fiber that would typically be longer than the one in the test, e.g. up to 100 m for 100 GBASE-SR4, and a different receiver. The calculated TDPs according to the invention is named "soft" TDP, in order also to differentiate to other TDP's, as the suggested method is a softer approach calculating on the basis of the histograms.

"Soft" TDP is defined similarly to TDP as the ratio of the sensitivity that would be seen when receiving an optical transmitter's signal after a worst case fiber and a specified receiver to the sensitivity that would be seen when receiving an ideal signal with the same OMA. The optical oscilloscope is set up as a receiver to accumulate samples of the signal from the transmitter under test when transmitting a test pattern e.g. PRBS9. The average optical power $P_{ave}$, the crossing points of the signal, and four vertical histograms are derived from the measurements by conventional means e.g. in the oscilloscope, and are used to calculate "soft" TDP. The four vertical histograms are centered at (for example) 0.4 UI and 0.6 UI, and above and below (for example) $P_{ave}$. Also, the standard deviation of the noise of the oscilloscope, S, is determined with no optical input signal.

Thus, the method provides for a better prediction of the performance in service of the ODL, in a cheaper and more accessible way than the previous standard required for the manufacturers of the optical transmitters for ODLs, as well as it removes the requirement of performing and updating the rather costly and often inaccurate calibration of the references ($T_{x\ ref}$, $R_{x\ ref}$) being utilized in a conventional TDP measurement.

Other link types such as 100G PSM4 MSA or CWDM4 MSA might also benefit from the above method, if adapted correctly, i.e. taking account of the different bandwidths etc.

Further, in an embodiment the present method includes otherwise not addressed impairments of the ODL, such as in particular clock jitter, baseline wander, but also other hitherto imperfectly addressed contributions to noise. Further, it allows to calculates a true penalty ("soft" TDP), see further below.

In an example there is provided a method of measuring optical link signal quality, the method comprising the following steps:

0. Provide a 100 Gb/s optical link comprising an optical transmitter and an optical oscilloscope receiver;
   A. Capture an averaged eye, e.g. using a PRBS9 pattern, from the transmitter with the oscilloscope receiver having an oscilloscope bandwidth as available, such as 19 GHz;
   A1. Capture histograms from averaged eye;
   B. From non-averaged eye, e.g. using PRBS9 pattern, capture histograms;
   C. Deconvolve A1 from B, giving an estimate of the wideband noise;
   D. From non-averaged eye, e.g. using PRBS31 pattern, capture histograms;
   E. Deconvolve B from D, giving an estimate of the low frequency noise and patterning;
   F. Filter waveform A as if in a bandwidth representative of the dispersion of the fiber link and the expected bandwidth of a data receiver in service, e.g. 12.6 GHz for a 26 GBd signal in 100GBASE-SR4, e.g. using a processor;
   G. Convolve with about 80% of noise C and all of noise E;
   H. Calculate the TDP.

The 80% being the sqrt(12.6 GHz/19 GHz), i.e. the proportion of the noise observed in 19 GHz that would be observed in 12.6 GHz assuming noise C is white.

In an ideal setup, it would be an advantage to be able to send a long pattern, such as a PRBS31 pattern or longer, to form the averaged eye, however the oscilloscopes of today are not sufficiently "quick" to gather such data. Thus, the proposed steps A-H and 1-6 are approximative methods of modelling such capture in a different way.

In an example of the method, the steps 3, 4, and/or 5, or steps C, E, F, and/or G are done automatically by the running of software by a processor, e.g. within the scope receiver. Steps 6 or H could be done automated in the scope.

In examples of the method, the step 6 or step H of calculating the TDP is performed by the following steps TDP1—Measure scope noise S with no input;
TDP2—Calculate the amount of Gaussian noise G, preferably comprising that of the receiver and optionally other noises, that could be tolerated for a predetermined target bit error ratio;
TDP2A—Estimate modal noise M;
TDP2B—Estimate mode partition noise N from worst case transmitter and channel spectral properties, using established formulas, such as in the 10 Gigabit Ethernet link model;
TDP2C—Root sum square the noises from one or more of TDP2A and TDP2B and TDP1 giving the required maximum receiver noise R;
TDP3—resulting in a TDP which is proportional to the result of TDC2C, i.e. R.

In step TDP2, this would typically be an iterative but not onerous calculation. As an alternative to iteration, the amount of Gaussian noise G could be found by interpolation.

In an embodiment, the root sum square of the noises, R, is equal to $\sqrt{(G^2+S^2-M^2-N^2)}$;

TDP is the ratio of the amount of noise that a receiver could apply to an ideal signal with the same OMA as the signal under test to achieve the target bit error ratio (TDP0) to the amount of noise that the receiver could apply to the signal under test, i.e. TDP2C. TDP0 is $OMA/(2*Q_{min})$, where $Q_{min}$ is a constant close to 7 for a target bit error ratio of 1e-12 according to the known to the skilled person "error function" or "Q function", or 3.8906 for a BER of $5\times10^{-5}$. Typically TDP is expressed in decibels: dB(TDP)=10*log 10 (TDP0/R)

Other variants and simplifications are conceivable which can be applicable to factory production testing of the optical transmitter such as estimating or ignoring some noise contribution, or taking others into account, depending on the ODL in question.

In the steps A-G there is provided the probability distribution functions of the signal as well as the scope noise in the correct bandwidth. In the steps TDP1-TDP3 the following is assumed: Scope noise, receiver noise, modal noise and mode partition noise are all Gaussian and additive, although in one variant the mode partition noise is assumed to depend on the signal quality as modeled in the 10 Gigabit Ethernet link model.

In an example, other measures of signal amplitude which are more or less similar to OMA may be used than as described below (*). F's OMA is assumed close enough to A's OMA, although either could be used.

In an example, in step TDP2A, the modal noise is assumed proportional to the signal's average amplitude or, more conservatively, the average level in the "one bits" as used in eye mask alignment, refer e.g. to IEC 61280-2-2.

In an example it is desired to filter waveform A as if in the relevant bandwidth for a worst link, giving the expectation of a waveform F. Optionally, it is desired to adjust C and D to e.g. enforce dual-Dirac model or other criterion. This should not be necessary unless these noises dominate all other effects such as patterning in A1 and receiver, modal noise and mode partition noise.

In an example, it is desired to convolve F with some of noise C depending on proportion of relevant bandwidth to scope bandwidth and all of noise E, but allowing for scope noise if significant or allow for scope noise in the next step.

In the steps TDP1-3 may be calculated a "soft TDP" (as in software implemented TDP) by finding the largest possible amount of Gaussian noise that a receiver can have, relative to signal F's OMA, for the selected target bit error ratio.

Some of the noise would be contributed by modal noise and mode partition noise; estimate modal noise e.g. assuming proportional to signal's amplitude; estimate mode partition noise from worst case transmitter and channel spectral properties; formulas for this are established in e.g. the 10 Gigabit Ethernet link model, described in Fiber Channel—Methodologies for Signal Quality Specification (MSQS), clause 4. RSS out these estimated noises according to the formula in TDP2C and the remainder is the maximum receiver noise for the target BER. The "soft TDP" is proportional to this noise divided by the OMA according to the formulae above.

Obviously there are many variants and simplifications of the TDP steps of the method that could be used for e.g. factory production testing.

In an embodiment of the method, the Gaussian noise of the above methods can be estimated in two ways: convolution or by a mathematical approach termed non-convolution:

1. Choose a trial amount of noise. The noise is assumed to have a Gaussian distribution; this is a reasonable assumption both for an optical receiver and for an oscilloscope with an optical input.
2. Convolve each histogram with a Gaussian distribution representing this noise, giving histograms that might be seen in a noisy receiver. The integral of the tail of each histogram that falls on the wrong side of the decision level, which is $P_{ave}$, gives the BER of that histogram for that noise.
3. The receiver's decision timing might be consistently early or late, and typically half the transmitted bits are ones and half are zeros, so after normalizing each histogram to a total of 1, take the average of the area under the tails of the upper and lower histograms on the left, and of the pair on the right. The worst of left and right is the predicted BER for the transmitter under test, for the trial amount of noise.
4. Compare this BER with the target BER. If it is higher than the target, choose a new smaller trial amount of noise, if lower, choose higher. Instead of simply arriving at a BER below the maximum BER of e.g. the target BER of e.g. $5\times10^{-5}$, the above method is made iterative (step 4) in order to arrive at the target BER of $5\times10^{-5}$.
5. Repeat the process until the BER is close to the target. Now we know the largest amount of Gaussian noise that could be added. The adjustments and subsequent calculation of TDEC are described above in TDP2C. An equivalent method of finding the largest amount of Gaussian noise that could be added, which is described in IEEE 802.3bm, is presented below.

The histograms of the eye-masks are analysed, in pairs as above, in order to find the largest amount of Gaussian noise that could be added to the signal while achieving the target BER.

6. This amount of Gaussian noise (whether from the convolution method or the equivalent method below) is adjusted for the known instrument noise in the measurement that would be different in a link, and effects in a worst case link that are not present in the measurement, as in TDP2C above.
7. Also, the largest amount of Gaussian noise that could be added to an ideal signal with the same OMA, for the same BER, TDP0 above, is calculated.
8. The ratio of the two noises is converted into a penalty, dB(TDP) above.

The calculation, steps 1 to 5, can be done without explicit convolutions by the following equivalent mathematical approach, called the non-convolution because the integral of a Gaussian distribution (the Normal curve) is a well-known function, called Q below, which is related to the "complementary error function":

$$Q(x) = \int_x^\infty \exp(-z^2/2)/\sqrt{(2\pi)} dz$$

where x is $(y-P_{ave})/\sigma G$ or $(P_{ave}-y)/\sigma G$ and $\sigma G$ is the left or right standard deviation, $\sigma L$ or $\sigma R$.

The two (upper and lower) functions Q can be used as weighting functions. Trial noises $\sigma L$ and $\sigma R$ are chosen. Each histogram is normalized to 1 and multiplied by a weighting function Q, which is large for samples near to the decision level $P_{ave}$ (near the middle of the eye) and small for samples far away. Note that samples from a range of levels contribute to errors—finding a single point on a histogram would not accurately predict the BER. The weighted distributions are integrated to obtain the predicted BERs from upper and lower, left and right, histograms. The left pair of BERs and the right pair are averaged. New trial noises $\sigma L$ and $\sigma R$ are chosen, and the iteration continues until the predicted BERs are close to the target. This procedure finds values of $\sigma G$ ($\sigma L$ or $\sigma R$) such that the equation below is satisfied:

$$\frac{\int fu(y)Q((y-P_{ave})/\sigma G)dy / \int fu(y)dy + \int fl(y)Q((P_{ave}-y)/\sigma G)dy / \int fl(y)dy}{2} = 5\times10^{-5}$$

where fu and fl are the upper and lower distributions and $\sigma G$ is the left or right standard deviation, $\sigma L$ or $\sigma R$. $5\times10^{-5}$ is the target BER.

The lesser of $\sigma L$ and $\sigma R$ is N.

Advantages of the present method may include that it avoids the special reference transmitter and additional receiver that TDP uses presently as defined. The present method covers long pattern or service signal, can take transmitter's actual noise into account, can take scope noise, modal noise and mode partition noise into account for calculating a true penalty. Because it measures the signal in the right bandwidth (as in the worst case link scenario i.e. a bandwidth that is representative of a worst-case link including a receiver) and takes much more of the signal's distribution into account than the single percentile of a distribution that VECP or TxVEC uses, and calculates a true penalty, it treats different transmitters with the same penalty equally, so enabling the trade-off between signal strength and signal quality which is a significant advantage of the TDP method. By comparison, VECPq finds an SNR margin at a constant OMA—not an e.g. OMA-TDP limit at constant margin, and it is not suitable for trade-off between signal strength and signal quality.

In examples, one or more of the steps of the present method can be automated with software installed and running either in the scope, or in a separate computer.

A difference between the present method and prior art is that the present method captures or takes into consideration clock jitter and baseline wander as well as other impairments. For production testing, it is advantageous to simplify this, but the suggested method in the standard can be considered thorough and reliable. The present method calculates a true penalty based on the correct, actual transmitter noise, using the right statistics and in the right bandwidth. Therefore the present method provides a better correlation to actual performance, and can be used for OMA-TDP style trade-off for low cost Tx.

Figure 1:
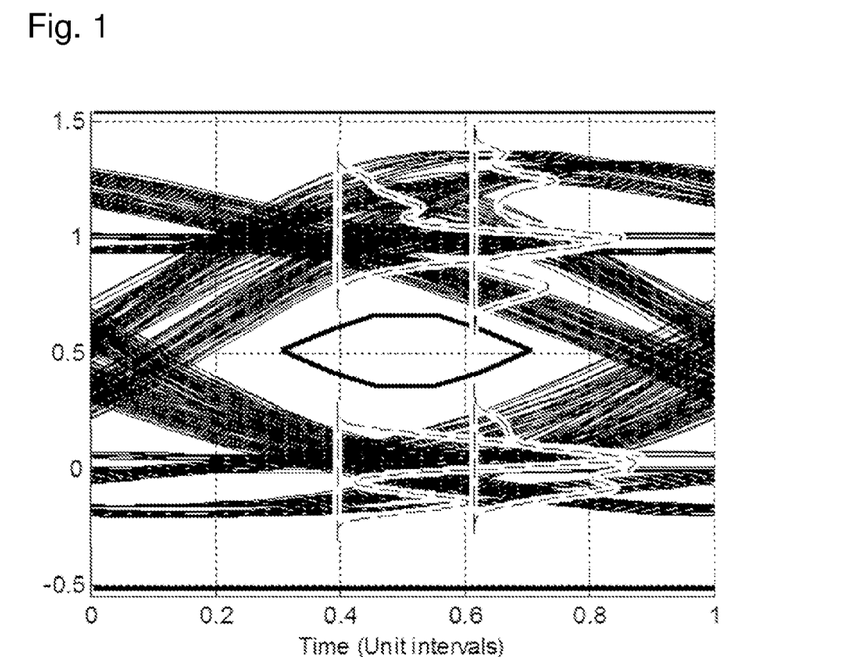
FIG. 1 shows a received waveform, the averaged eye, on the oscilloscope of a PRBS9 pattern, filtered in 19 GHz.
Figure 2:
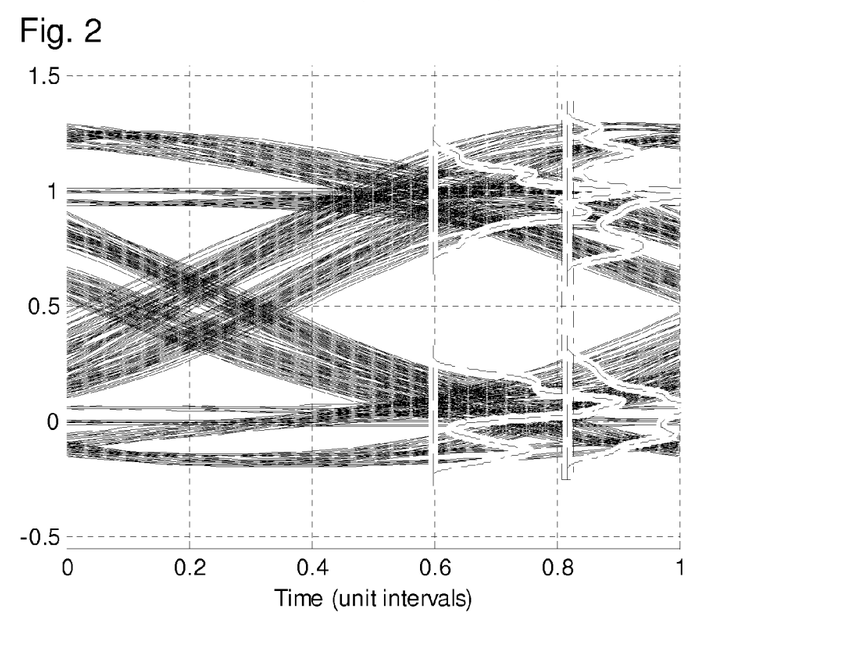
FIG. 2 shows the received waveform on the oscilloscope after the 12.6 GHz filter (roughly equivalent to a receiver after the optical fiber), the filtering of the waveform provided by a processor.

In the FIGS. 1 and 2 are seen examples of waveforms:

FIG. 1 shows the received waveform, the averaged eye, on the oscilloscope of a PRBS9 pattern, filtered in 19 GHz. The vertical histogram windows are +/−0.11 Unit Interval (UI) from eye centre and provide the (density) histograms, shown by dashed lines. The vertical histogram windows, shown by a dash-dot line, provided symmetrically around the eye mask, is the area of the measurement from which the histograms are built. The Y-axis is normalized to 0 and 1 from the OMA algorithm.

FIG. 2 shows the received waveform on the oscilloscope after the 12.6 GHz filter (roughly equivalent to a receiver after the optical fiber), the filtering of the waveform provided by a processor. It can be seen that this is slower than the signal observed by the 19 GHz oscilloscope (roughly, equivalent to a very short optical fiber and a receiver), but not necessarily worse. The eye is as calculated in the lower bandwidth, with histograms and one histogram window.

Concerning the histograms on the scopes—It is herein suggested to measure vertical histograms at specified times approximately +/−0.11 UI away from ½ way between mean crossing times. +/−0.11 UI is an example considered for 100GBASE-SR4; other amounts could be used. The best timing offsets in 19 GHz might not be the same as in 12.6 GHz; in this method these offsets can differ.

All tests can be performed with a standard Clock and Data Recovery unit (CDR) in the measurements/capture, or without, as appropriate.

The measurement in step D of non-averaged PRBS31 could be the same as used for the eye mask, depending how the oscilloscope collects its samples.

One can deconvolve two or four sub-histograms (left, right, top, bottom) separately, as upper and lower noises might differ, or together, which would give more samples in each calculation.

(*) In an example one may calculate apparent OMA from the averaged PRBS9 using the established method given in IEEE 802.3 and P802.3bm—then there is no need for a separate square wave measurement for measuring OMA. Using a PRBS11 pattern may provide better results than PRBS9. However there is a 802.3 standard PMA option for the latter. Further, a 100GBASE-SR4 encoded signal could be used in place of the PRBS31.

Prior art VEC or TxVEC method takes the same histograms and a measure of OMA, but simply finds the worst of the four histograms, but measured in e.g. 19 GHz, at a certain percentile.

The present method of the invention including TDP calculation can include modal noise and mode partition noise and is more accurate than the prior art "hardware" TDP method with an allowance in dB for these. It is assumed that modal noise is proportional to signal amplitude (not swing). In an example one may use the mean level found for eye mask as signal amplitude here, this may be a little conservative, but it lets the transmitter implementer choose extinction ratio and pay for his choice rather than the receiver having to tolerate all the modal noise associated with the lowest extinction ratio allowed. Because spectral width is often not very stable or reproducible, it is advantageous to use spec-worst spectral width and standard MPN formula as also previously used in the 10 Gigabit Ethernet link model/standard.

The present method assumes that the oscilloscope's response is linear and that we know its response shape (in frequency or time). Typically, the oscilloscope vendor supplies an accurate measurement of each plug-in's response. An oscilloscope with a real (hardware) bandwidth near to 12.6 GHz would measure the noise more accurately than a 19 GHz oscilloscope, and one can still use the oscilloscope response calibration file to make the signal shape measurement more exact.

Deconvolution assumes the noise is additive. It is also assumed that the noise on PRBS9 is white, as in the absence of specialist measurements is generally assumed as a reasonable estimate.

Convolving with the measured noise estimates and ideal Gaussian noise "added" in the TDP calculation should greatly reduce any deconvolution issues—this is correct as long as the scope is less noisy than the combination of Rx noise, MN, and MPN.

The prior art standard also limited OMA-TDP—which presently needs a measurement of signal power, not just its shape. VECPq and TWDP find an SNR margin at a constant OMA; by the present method, by finding TDP, it is possible to use a OMA-TDP limit at constant margin. By comparison, VECPq finds (with approximations) an SNR margin (the ratio of the SNR that the receiver would experience from an ideal transmitter to the SNR that it would experience from the transmitter under test at the same OMA, while TDP and this method find a power margin (the ratio of the OMA from the transmitter under test to the OMA of an ideal transmitter for the same receiver and target BER) or power penalty (proportional to the inverse of the power margin). The latter is suitable for trade-off between signal strength and signal quality, which enables the use of an OMA-TDP limit at constant margin for cost-effective production with a range of product technology, and the former (SNR margin, with approximations) is not.

The present method of finding the receiver noise that would deliver a target BER may be said to give a true penalty.

As an example of the type of scope which are suitable for performing the measurements described herein, can be mentioned the DSA8300 Digital Sampling Oscilloscope from Tektronix, which is a complete high-speed PHY Layer testing platform for data communications from 155 Mb/sec to 100 G.

In other embodiments there are provided methods of calculating transmitter and dispersion penalty for predicting optical data link signal quality A first method comprising 0. Provide an optical data link comprising an optical transmitter and an optical oscilloscope receiver;
1. Capture an averaged eye, e.g. using a PRBS9 pattern, from the transmitter with the oscilloscope receiver having an oscilloscope bandwidth as available, such as 19 GHz for a 26 GBd signal;
   1a. From the averaged eye, capture histograms A1;
2. From non-averaged eye, e.g. using a PRBS9 pattern, capture histograms B1;
3. De-convolve histograms A1 from histograms B1, giving an estimate of the noise;
4. Filter waveform 1 as if in a bandwidth representative of the dispersion of the fibre link and the expected bandwidth of a data receiver in service, e.g. 12.6 GHz for a 26 GBd signal in 100GBASE-SR4, for example using a processor;
5. Convolve the filtered waveform from 4 with the estimate of the noise from 3;
6. Calculate TDP.

A second method of measuring optical data link signal quality, the method comprising 0. Provide a 100 Gb/s optical data link comprising an optical transmitter and an optical oscilloscope receiver;
   A. Capture an averaged eye, e.g. using a PRBS9 pattern, from the transmitter with the oscilloscope receiver having an oscilloscope bandwidth as available, such as 19 GHz;
   A1. Capture histograms from averaged eye;
   B. From non-averaged eye, e.g. using PRBS9 pattern, capture histograms;
   C. Deconvolve A1 from B, giving an estimate of the wideband noise;
   D. From non-averaged eye, e.g. using PRBS31 pattern, capture histograms;
   E. Deconvolve C from D, giving an estimate of the low frequency noise and patterning;
   F. Filter waveform A as if in a bandwidth representative of the dispersion of the fibre link and the expected bandwidth of a data receiver in service, e.g. 12.6 GHz for a 26 GBd signal in 100GBASE-SR4, e.g. using a processor;
   G. Convolve with about 80% of noise C and all of noise E;
   H. Calculate the TDP.

In examples of the first and second method, the step 6 or step H of calculating the TDP is performed by the following steps TDP1—Measure scope noise with no input;
TDP2—Calculate the amount of Gaussian noise, preferably comprising that of the receiver and optionally other noises, that could be tolerated for a predetermined target bit error ratio;
TDP2A—Estimate modal noise;
TDP2B—Estimate mode partition noise from worst case transmitter and channel spectral properties, using established formulas, such as in the 10 Gigabit Ethernet link model;
TDP2C—Root sum square the noises from one or more of TDP2A and TDP2B and TDP1 giving the required maximum receiver noise;
TDP3—resulting in a TDP which is proportional to the result of TDC2C.

I claim:

1. A method of calculating a transmitter and dispersion penalty (TDP) for predicting optical link signal quality, said method comprising:
   0) provide an optical link comprising an optical transmitter, an optical fiber, and an optical oscilloscope receiver linked together;
   1) capture an averaged eye, using an optical test signal sequence to drive the transmitter with the oscilloscope receiver having an oscilloscope bandwidth as available; and from the averaged eye, capturing histograms A1;
   2) capture a non-averaged eye using an optical test signal sequence to drive the transmitter, and from the non-averaged eye, capturing histograms B1;
   3) de-convolve histograms A1 from histograms B1, giving an estimate of the noise on the signal and the noise stemming from the oscilloscope;
   4) filter the waveform from step 1) that gave the averaged eye, as if in a bandwidth representative of the dispersion of the fiber link and the expected bandwidth of a data receiver in service,
   5) convolve the filtered waveform from step 4) with the estimate of the noise from step 3); proving an eye and capturing the histogram of said eye providing a probability distribution function; and
   6) calculate a soft TDP based on said probability distribution function.

2. The method according to claim 1, the steps 1) and 2) being interchangeable.

3. The method according to claim 1, the available bandwidth of the oscilloscope being 19 GHz for a 26 GBd signal.

4. The method according to claim 1, the optical test signal sequence in step 1) and step 2) being a PRBS9 pattern.

5. The method according to claim 1, the average optical power $P_{ave}$, the crossing points of the signal, and four vertical histograms are used to calculate said histograms and are being derived from the measurements by the oscilloscope receiver.

6. The method according to claim 1, the filtering of waveform 1) in step 4) being performed by a processor.

7. The method according to claim 1, one or more of the steps 0)-6) being automated with software installed and running in the oscilloscope or in a separate computer processor.

8. The method according to claim 1, further comprising taking into account other noises of the optical link selected from the group consisting of clock jitter, and baseline wander.

9. The method according to claim 1, the deconvolving comprising two or four sub-histograms left, right, top, bottom, respectively, separately or together.

10. The method according to claim 1, in step 4) the expected bandwidth of a data receiver in service being 12.6 GHz for a 26 GBd signal in 100GBASE-SR4.

11. A method of calculating transmitter and dispersion penalty (TDP) for predicting optical link signal quality, said method comprising the following steps:
   0. provide a 100 Gb/s optical link comprising an optical transmitter, an optical fiber enabled for 100 Gb/s transmission, and an optical oscilloscope receiver;
   A. capture an averaged eye and the waveform that gave the averaged eye using a test pattern, with the oscilloscope receiver having an oscilloscope bandwidth of 19 GHz as available;
   A1. Capture histograms from averaged eye;

B. from a non-averaged eye, using a PRBS9 pattern, capture histograms;
C. deconvolve A1 from B, giving an estimate of the wideband noise;
D. from the non-averaged eye, using a PRBS31 pattern, capture histograms;
E. deconvolve B from D, giving an estimate of the low frequency noise and patterning;
F. filter the waveform that gave the averaged eye A as if in a bandwidth representative of the dispersion of the fiber link and the expected bandwidth of a data receiver in service of 12.6 GHz for a 26 GBd signal in 100GBASE-SR4, using a processor;
G. convolve with about 80% of noise C and all of noise E; and
H. calculate the TDP.

12. The method according to claim 11, the steps A, B, D being interchangeable.

13. The method according to claim 1 or claim 11, the optical fiber being a multimode or a single-mode optical fiber.

14. The method according to claim 11, one or more of the steps C, E, F, G, H being performed automatically by running of software by a separate processor within the oscilloscope receiver.

15. The method according to claim 11, filtering waveform A as if in the relevant bandwidth for a worst link target BER, giving the expectation of a waveform F.

16. The method according to claim 11, steps C and D being adjusted to enforce the dual-Dirac model.

17. The method according to claim 11, where convolving F is convolved with only part of the noise C depending on proportion of relevant bandwidth to oscilloscope bandwidth, and with all of noise E.

18. A method of calculating a transmitter and dispersion penalty for predicting optical link signal quality, said method comprising: providing an optical link comprising an optical fiber, an optical transmitter and an optical oscilloscope receiver;
  TDP1—measure scope noise S with no input;
  TDP2—calculate the largest expected amount of Gaussian noise G, preferably comprising that of the optical oscilloscope receiver and optionally other noises, that could be tolerated for a predetermined target bit error ratio;
  TDP2A—estimate largest expected modal noise M;
  TDP2B—estimate largest expected mode partition noise N from worst case transmitter and channel spectral properties, using established 10 Gigabit Ethernet link model formulas;
  TDP2C—root sum square the noises from one or more of TDP2A and TDP2B and TDP2 and TDP1 giving the required maximum receiver noise R in order to reach target BER; and
  TDP3—resulting in a TDP which is proportional to the result of TDP2C.

19. The method according to claim 18, being performed within step 6) in claim 1 or being performed within step H) in claim 13.

20. The method according to claim 18, the root sum square of the noises R being equal to $\sqrt{(G^2+S^2-M^2-N^2)}$.

21. The method according to claim 18, scope noise, receiver noise, modal noise and mode partition noise being assumed to be Gaussian in nature and therefore additive.

22. The method according to claim 18, the mode partition noise N being assumed to depend on the signal quality as modeled in the 10 Gigabit Ethernet link model.

23. The method according to claim 18, the modal noise M is assumed proportional to the signal's average amplitude.

24. The method according to claim 18, the steps TDP1-3 being software implemented, resulting in a so-called "soft TDP", by finding the largest possible amount of Gaussian noise that a receiver can have, relative to signal F's OMA, for the target BER.

25. The method according to claim 18, the step of TDP2—calculating the amount of Gaussian noise—being performed by the iterative convolution steps:
  1a. choosing a first trial amount of noise provided with a Gaussian distribution, and provided from e.g. a processor;
  2a. convolving this on the optical oscilloscope receiver i.e. resulting from the trial amount of noise and of the probability distribution function derived or measured—providing a set of histograms;
  3a. after normalizing each histogram to a total of 1, take the average of the area under the tails of the upper and lower histograms on the left, and of the pair on the right, where the worst of left and right is the resulting bit error ratio for the transmitter under test for that trial amount of noise;
  4a. compare this resulting bit error ratio with the target bit error ratio—if it is higher than the target bit error ratio, choose a smaller trial amount of noise, if it is lower than the target bit error ratio, choose a higher trial amount of noise; and
  5a. repeat the process until the resulting bit error ratio is approximately equal to the target bit error ratio.

26. The method according to claim 18, the step of TDP2—calculating the amount of Gaussian noise—being performed by the iterative non-convolution steps, each non-convolution step comprising:
  performing a complementary error function calculation using the integral of a Gaussian distribution of the Normal curve, called Q below, which is related to the "complementary error function":

$$Q(x)=\int_x^\infty \exp(-z^2/2)/\sqrt{(2\pi)}dz$$

where x is (y−Pave)/σG or (Pave−y)/σG and σG is the left or right standard deviation, σL or σR:
  use the two upper and lower functions Q used as weighting functions
  choose trial noises σL and σR,
  normalize each histogram to 1 and multiplied by a weighting function Q, which is large for samples near to the decision level Pave (near the middle of the eye) and small for samples far away;
  integrate the weighted distributions to obtain the resulting bit error ratio from upper and lower, left and right, histograms;
  average the left pair of resulting bit error ratios and the right pair of resulting bit error ratios;
  choose new trial noises σL and σR, and the iteration continues until the resulting resulting bit error ratio is close to the target bit error ratio;
  thus finding values of σG, i.e. σL or σR such that the equation below is satisfied:

$$(\int fu(y)Q((y-Pave)/\sigma G)dy/\int fu(y)dy+\int fl(y)Q((Pave-y)/\sigma G)dy/\int fl(y)dy)/2=5\times 10^{-5}$$

where fu and fl are the upper and lower distributions and σG is the left or right standard deviation, σL or σR. $5\times 10^{-5}$ is the target BER;
  the lesser of σL and σR being G.

* * * * *